US012536501B1

United States Patent
Lee et al.

(10) Patent No.: US 12,536,501 B1
(45) Date of Patent: Jan. 27, 2026

(54) ENHANCED TRANSPARENCY AND CONSUMER ENGAGEMENT SYSTEM FOR TRADING

(71) Applicant: Arena Club, Inc., Los Angeles, CA (US)

(72) Inventors: Brian Lee, Los Angeles, CA (US); Vartul Agrawal, Los Angeles, CA (US); Jesse Glass, Santa Monica, CA (US)

(73) Assignee: Arena Club, Inc., Los Angeles, CA (US)

( * ) Notice: Subject to any disclaimer, the term of this patent is extended or adjusted under 35 U.S.C. 154(b) by 0 days.

(21) Appl. No.: 19/191,173

(22) Filed: Apr. 28, 2025

Related U.S. Application Data

(60) Provisional application No. 63/691,449, filed on Sep. 6, 2024, provisional application No. 63/691,458, filed on Sep. 6, 2024.

(51) Int. Cl.
*G06Q 10/087* (2023.01)
*G06Q 30/018* (2023.01)
*H04L 9/00* (2022.01)

(52) U.S. Cl.
CPC ....... *G06Q 10/087* (2013.01); *G06Q 30/0185* (2013.01); *H04L 9/50* (2022.05)

(58) Field of Classification Search
CPC ..... G06Q 10/087; G06Q 30/0185; H04L 9/50
USPC .......................................................... 705/28
See application file for complete search history.

(56) References Cited

U.S. PATENT DOCUMENTS

| | | |
|---|---|---|
| 5,748,731 A | 5/1998 | Shepherd |
| 8,060,420 B2 | 11/2011 | Vardi |
| 11,494,781 B2 | 11/2022 | Maina et al. |
| 2001/0039206 A1 | 11/2001 | Peppel |
| 2002/0042744 A1 | 4/2002 | Kohl |
| 2004/0098318 A1 | 5/2004 | Furukawa |
| 2004/0101158 A1 | 5/2004 | Butler |
| 2004/0101159 A1 | 5/2004 | Butler |
| 2007/0088654 A1 | 4/2007 | Maltzman |
| 2007/0232399 A1 | 10/2007 | Kathman et al. |
| 2012/0215631 A1 | 8/2012 | Walker et al. |
| 2014/0114787 A1 | 4/2014 | Groarke |
| 2014/0379394 A1 | 12/2014 | Walker et al. |

(Continued)

FOREIGN PATENT DOCUMENTS

| | | |
|---|---|---|
| CN | 105117923 A | 12/2015 |
| CN | 107153980 A | 9/2017 |

(Continued)

*Primary Examiner* — Russell S Glass
(74) *Attorney, Agent, or Firm* — Schell IP

(57) ABSTRACT

The disclosed invention presents a novel system for distributing trading cards that enhances transparency, consistency in value, and consumer engagement. This system addresses issues prevalent in both primary and secondary trading card markets by allowing consumers to view the exact cards they will receive prior to purchase, complete with specific odds of obtaining each card. Detailed card descriptions, including history and condition, are verified through a rigorous authentication process. The system also features a user-friendly digital interface that displays cards, odds, and comprehensive descriptions, continuously updated based on real-time market analysis and consumer feedback, thereby enhancing the trading card distribution process.

11 Claims, 6 Drawing Sheets

(56) References Cited

U.S. PATENT DOCUMENTS

| | | | |
|---|---|---|---|
| 2015/0310506 A1 | 10/2015 | Saito et al. | |
| 2016/0203556 A1* | 7/2016 | Lipper, III | G06Q 40/06 |
| | | | 705/36 R |
| 2017/0213265 A1 | 7/2017 | Masherah et al. | |
| 2023/0044043 A1 | 2/2023 | Johnson | |
| 2023/0119584 A1* | 4/2023 | Quigley | G06F 21/64 |
| | | | 705/65 |
| 2023/0124040 A1* | 4/2023 | Quigley | G06F 21/602 |
| | | | 705/65 |
| 2023/0124608 A1* | 4/2023 | Quigley | G06F 21/602 |
| | | | 705/65 |
| 2023/0421377 A1* | 12/2023 | Jakobsson | H04L 9/50 |
| 2025/0156828 A1* | 5/2025 | Sliwka | G06Q 20/02 |

FOREIGN PATENT DOCUMENTS

| | | | | |
|---|---|---|---|---|
| JP | 2004151867 A | | 5/2004 | |
| JP | 2004282942 A | | 10/2004 | |
| JP | 2023038226 A | * | 3/2023 | ......... G06Q 30/0185 |
| KR | 20070030545 A | | 3/2007 | |
| KR | 20220090338 A | | 6/2022 | |
| WO | 2004110578 A2 | | 12/2004 | |
| WO | 2010005964 A2 | | 1/2010 | |
| WO | 2013110070 A2 | | 7/2013 | |
| WO | 2023172516 A2 | | 9/2023 | |

\* cited by examiner

FIG. 2

ENHANCED TRANSPARENCY AND CONSUMER ENGAGEMENT SYSTEM FOR TRADING

CROSS-REFERENCE TO RELATED APPLICATIONS

This application claims the benefit of U.S. Provisional Patent Application No. 63/691,458, filed Sep. 6, 2024 and U.S. Provisional Patent Application No. 63/691,449 filed Sep. 6, 2024, which are hereby incorporated by reference in its entirety.

FIELD OF THE INVENTION

The present invention relates generally to systems and methods for digital trading card distribution, and more particularly to a computer-implemented system for managing trading card inventory with real-time transparency of odds and availability while integrating physical cards with digital assets through blockchain technology. The invention provides technological improvements in the field of trading card distribution through automated replenishment mechanisms, real-time synchronization of inventory data across distributed interfaces, and secure authentication of ownership using non-fungible tokens.

BACKGROUND OF THE INVENTION

The trading card market is traditionally divided into two main sectors: the primary market and the secondary market. The primary market consists of sealed packs of cards directly from manufacturers, where the contents are unknown until opened by the consumer. This element of surprise is a fundamental aspect of the trading card experience but often leads to inconsistencies in value perception among consumers.

The secondary market, on the other hand, involves the resale of cards that have already been opened and are known to the public. This market is characterized by its lack of transparency and predictability. Consumers often face challenges in determining the value of the cards they are purchasing due to the absence of a standardized system for card valuation and the opaque nature of transaction details. This lack of clarity can diminish consumer trust and satisfaction, as the actual value of the cards may not align with the price paid.

Furthermore, transactions associated with repack products on the secondary market are plagued by a significant issue: the resale of cards often resembles a game of chance rather than a transparent transaction. Consumers have little to no information about the odds of obtaining cards of a certain value, which can lead to dissatisfaction and a decrease in market participation.

The traditional trading card market has often been criticized for its lack of transparency, particularly in how it obscures the contents of packs and the likelihood of obtaining specific cards. This opacity can lead to consumer frustration and decreased engagement, as buyers may feel that their chances of obtaining valuable cards are not clearly communicated or fairly distributed. The trading card market has long faced issues related to opacity in transactions, inconsistent value offerings, and waning consumer interest due to unpredictable product replenishment. Traditional trading mechanisms in both primary and secondary markets lack the necessary transparency, often leaving consumers uncertain about the fairness of card values and the odds of obtaining high-value cards. This uncertainty can lead to decreased consumer trust and engagement, ultimately impacting market vitality. Further, in the conventional trading card market, the selection of available cards often remains static until new releases are issued, which can lead to consumer disinterest over time as the market stagnates.

It therefore remains to be desirable to introduce a new method of trading card distribution that addresses the shortcomings of both the primary and secondary markets.

SUMMARY OF THE INVENTION

The preferred embodiment of the invention comprises a system is designed to address the inherent issues in both the primary and secondary trading card markets by providing a more structured and consumer-friendly approach. Central to this system is the enhanced transparency feature, which allows consumers to view the exact cards they can receive prior to purchase, complete with specific odds detailing the likelihood of obtaining each card. This transparency is crucial in building trust and satisfaction among consumers, as it eliminates the uncertainty and perceived unfairness that can accompany traditional card trading practices. Additionally, the system includes a comprehensive grading and authentication process for each card, a user-friendly digital interface for easy browsing and purchasing, and a dynamic updating mechanism to keep the card offerings fresh and aligned with market trends. This innovative approach not only improves consumer trust and engagement but also revitalizes the trading card market by making it more transparent and equitable.

BRIEF DESCRIPTION OF THE FIGURES

FIG. 2 is a user interface mockup in accordance with an embodiment showcasing the transparent checklist feature, presenting an exemplary visual representation of the system's digital interface, displaying the list of available cards in a series, presented odds for each card, detailed card descriptions, real-time updates of card availability and odds, and visual indicators of card rarity and value.

DETAILED DESCRIPTION

The preferred embodiment of the invention pertains to a novel system for distributing trading cards that significantly enhances transparency, value consistency, and consumer engagement through a series of innovative mechanisms. The system is designed to address the inherent issues in both the primary and secondary trading card markets by providing a more structured and consumer-friendly approach.

Figure 1:
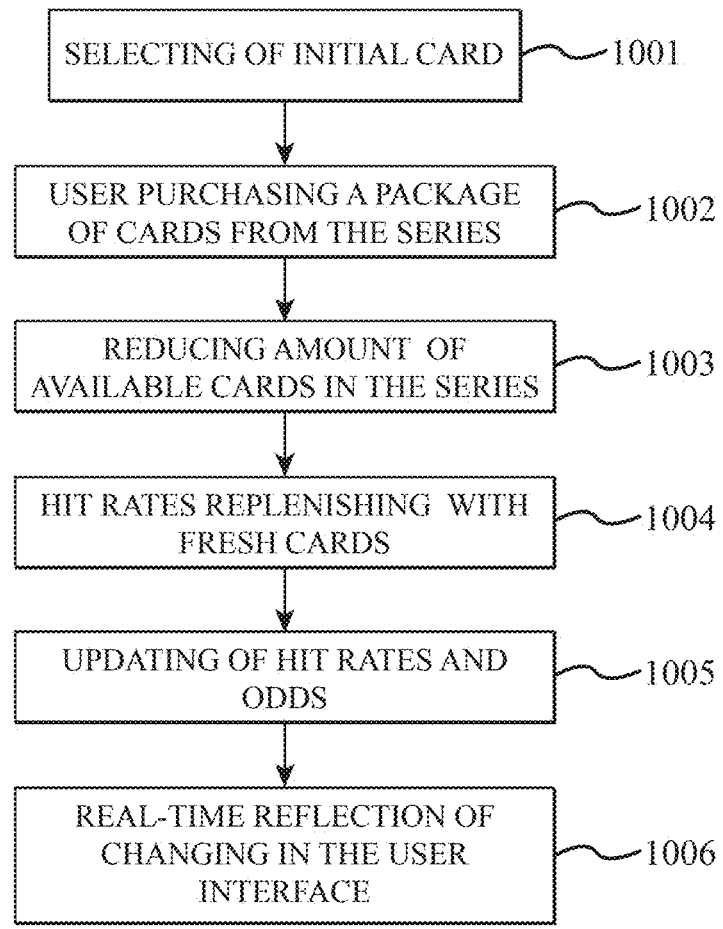
FIG. 1 is a flowchart illustrating the continuous replenishment mechanism of the trading card distribution system in an embodiment, depicting an exemplary process of maintaining a consistent number of cards in each Series, including steps for initial card selection, user purchase of a package, reduction of available cards, replenishment with fresh cards, updating of hit rates and odds, and real-time reflection of changes in the user interface.

Referring to FIG. 1, a flowchart 1000 illustrates the continuous replenishment mechanism of the trading card distribution system in accordance with an embodiment. The process begins with selecting an initial card 1001 to be included in a series. When a user purchases a package of cards from the series 1002, this triggers a reduction in the amount of available cards in the series 1003. The system then automatically replenishes the series with fresh cards 1004 to maintain consistent inventory levels. As cards are replenished, the system updates the hit rates and odds 1005 for all remaining cards. These changes are reflected in real-time through the user interface 1006 to maintain complete transparency of current card availability and acquisition odds.

Figure 2:
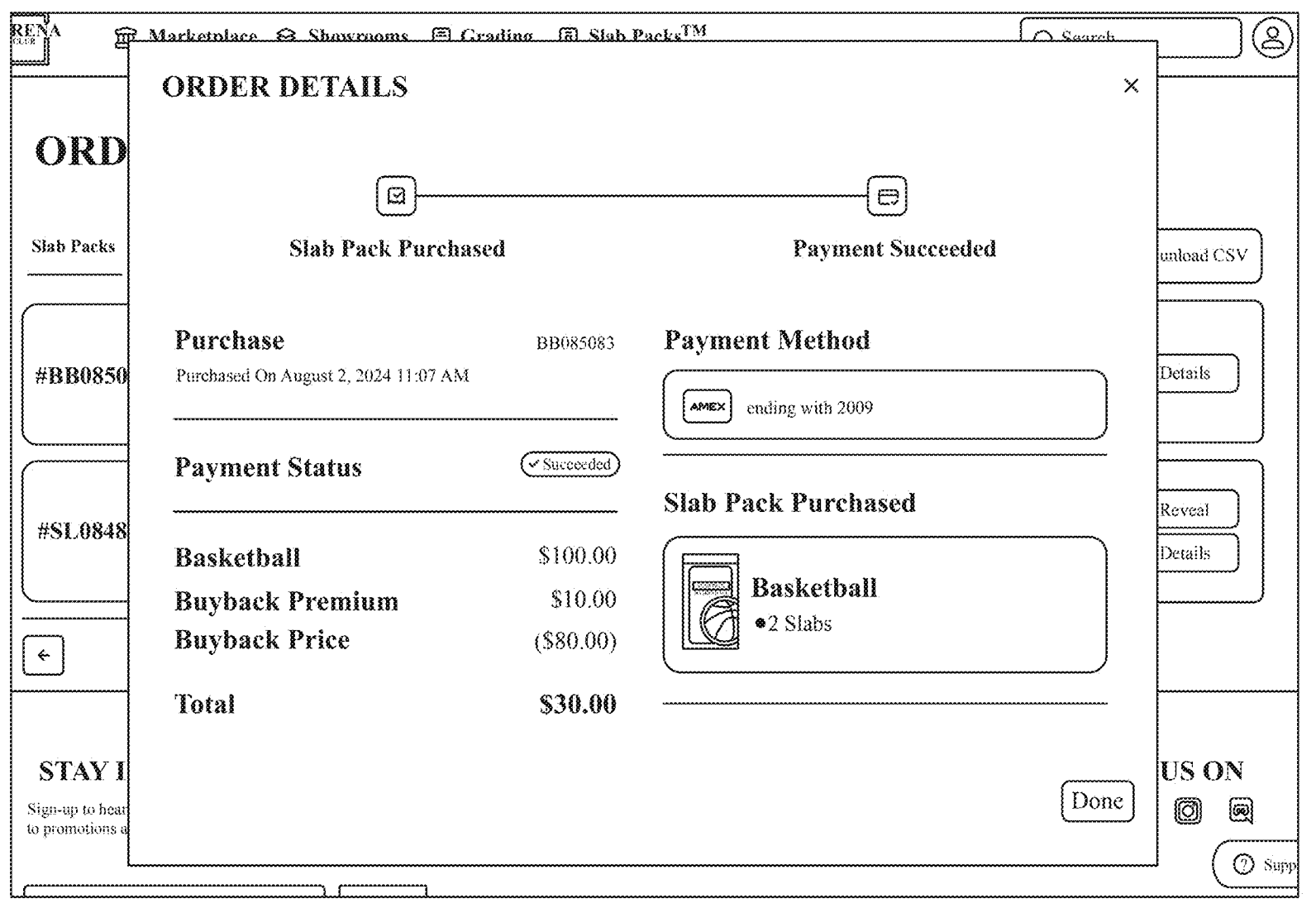

FIG. 2 illustrates an exemplary user interface implementation showing a completed purchase transaction in accordance with an embodiment. The interface displays order details including the purchase of Slab Packs with specific identifiers and associated payment information. The interface provides real-time confirmation of payment status and transaction details, including itemized costs for the basketball cards, buyback premium, and buyback price calculations. This implementation enables transparent tracking of all purchase transactions while maintaining detailed records of card acquisitions and pricing.

Figure 3:
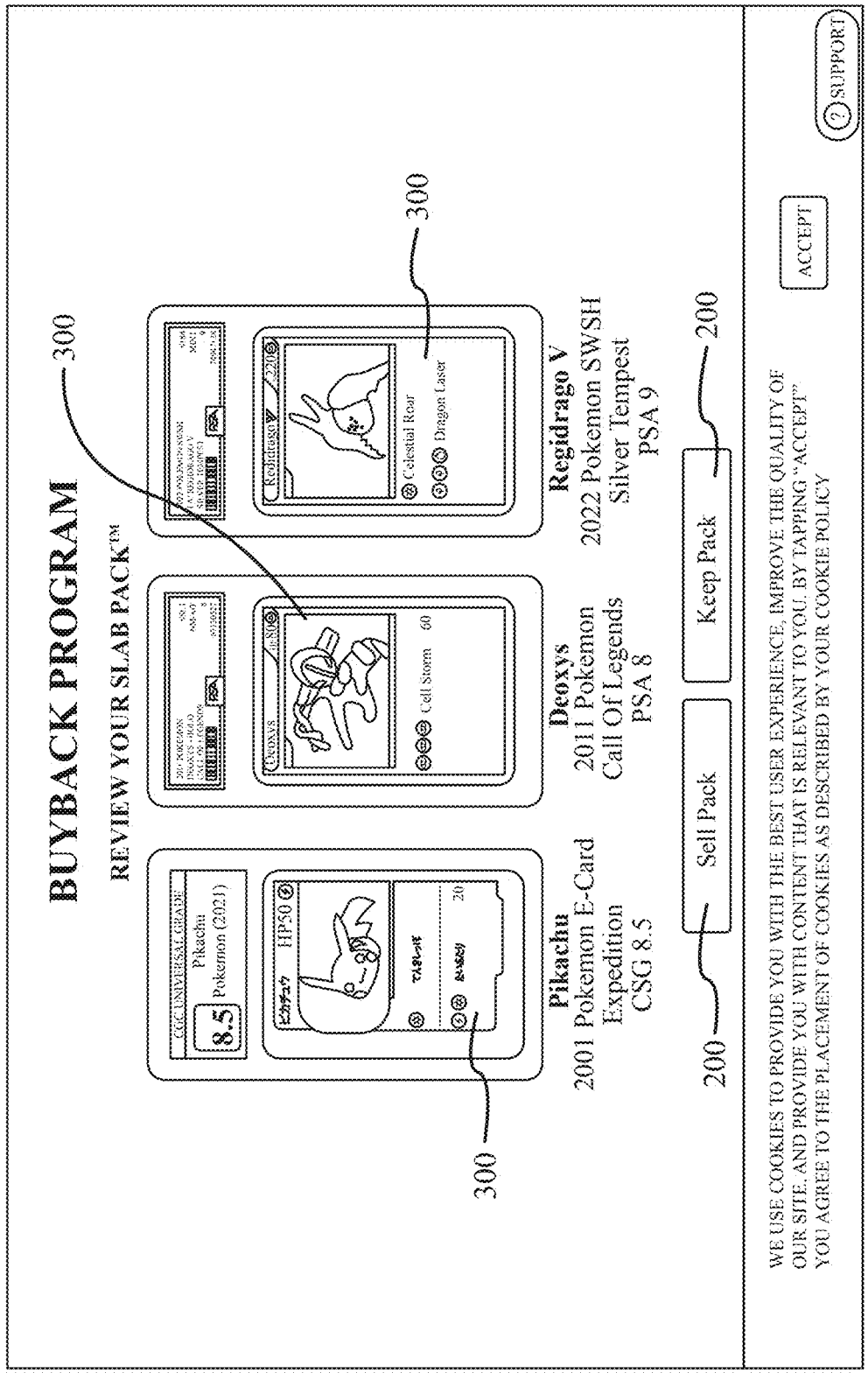
FIG. 3 is a system architecture diagram in accordance with an embodiment illustrating the overall structure of the trading card distribution system, outlining exemplary components including the digital interface, the database storing card information and descriptions, the algorithm for updating odds and descriptions, the continuous replenishment mechanism, the integration of physical and digital elements including NFTs, and the feedback collection and processing module.

FIG. 3 demonstrates a buyback program interface in accordance with an exemplary embodiment showing detailed card information including grading certification numbers and condition grades from multiple grading authorities. The interface displays high-resolution card images along with detailed authentication information, enabling users to verify card conditions and certification details before making purchase decisions. The system maintains synchronized records of both physical cards and their digital representations through unique identifiers.

Figure 4:
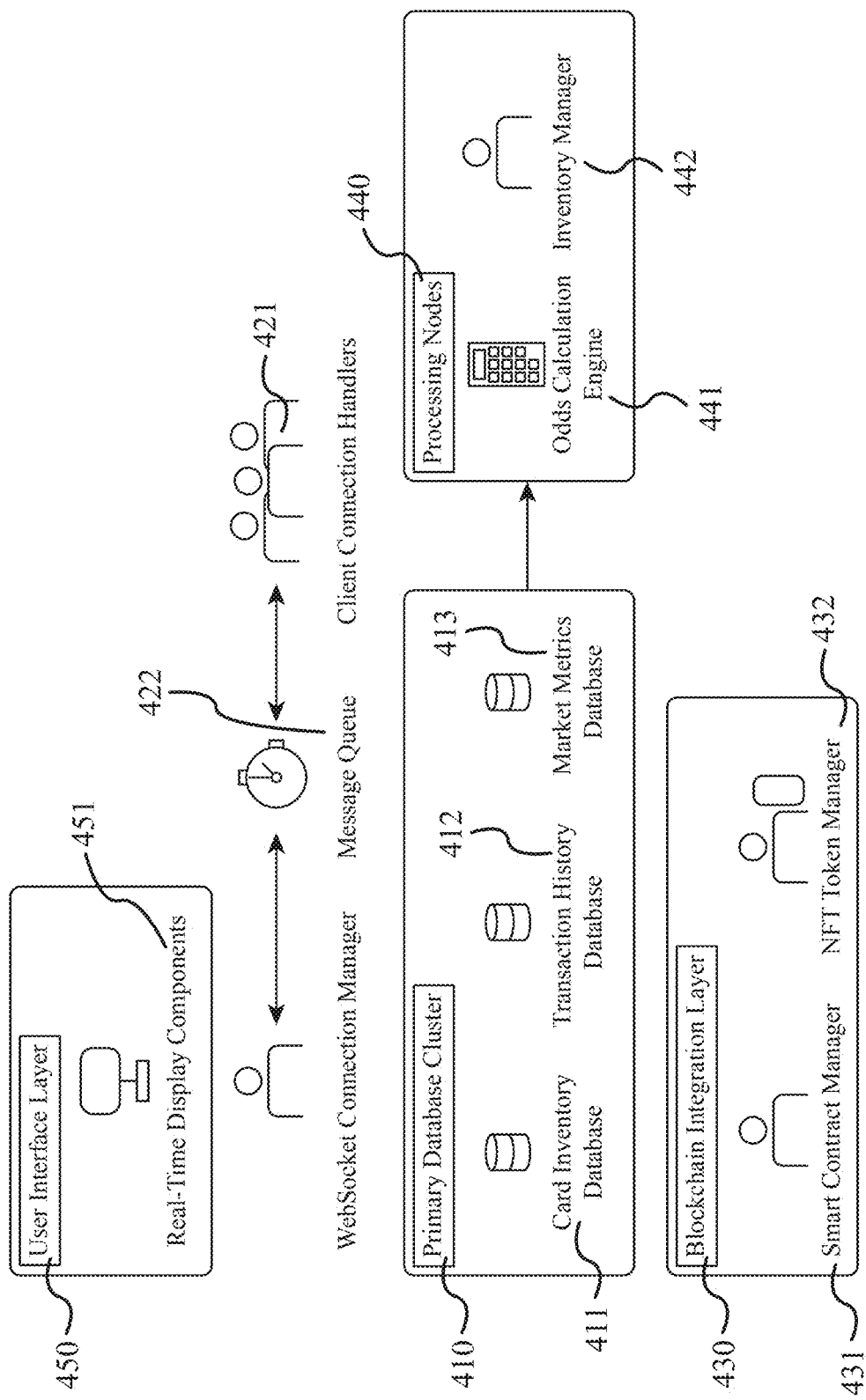
FIG. 4 is a system architecture diagram in accordance with an embodiment illustrating the distributed computing infrastructure of the trading card distribution system, showing the interconnection between the primary database cluster, WebSocket connection manager, blockchain integration layer, processing nodes, and user interface components that enable real-time card inventory management and odds calculation.

Referring to FIG. 4, the system architecture 400 in accordance with an embodiment implements a distributed computing infrastructure comprising multiple integrated components. The primary database cluster 410 includes dedicated databases for card inventory 411, transaction history 412, and market metrics 413. A WebSocket connection manager 420 coordinates client communications through connection handlers 421 and message queue 422. The blockchain integration layer 430 contains the smart contract manager 431 and NFT token manager 432. Processing nodes 440 execute continuous calculations through the odds calculation engine 441 and inventory manager 442. The user interface layer 450 presents real-time display components 451 to end users.

Figure 5:
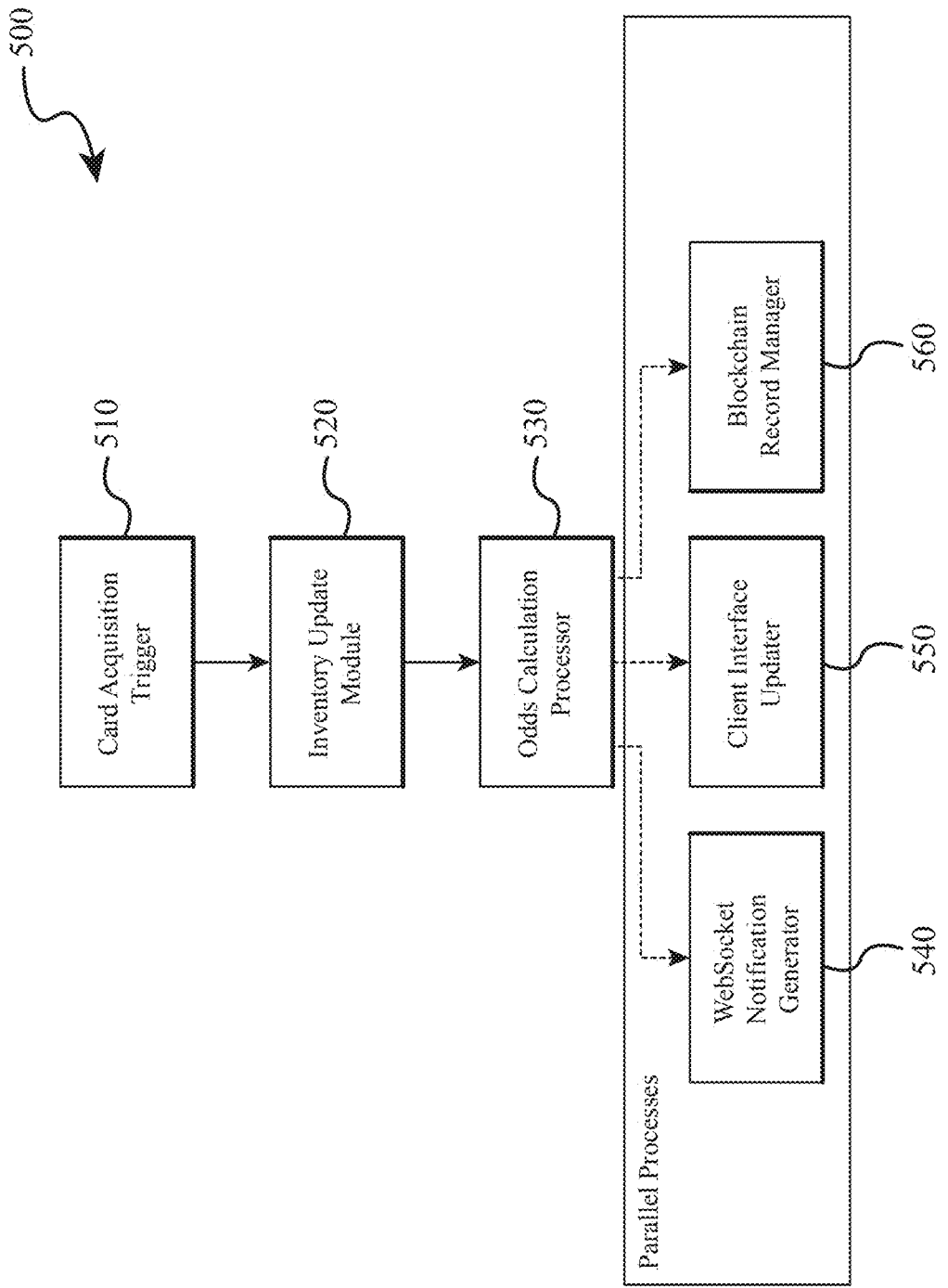
FIG. 5 is a process flow diagram in accordance with an embodiment depicting the real-time update sequence triggered by card acquisitions, including inventory decrements, odds recalculation, notification generation, interface updates, and blockchain record management that maintain synchronized data across the distributed system.

FIG. 5 illustrates the real-time update process 500 triggered by card acquisitions 510 in accordance with an embodiment. When triggered, the inventory update module 520 decrements available card counts while the odds calculation processor 530 recalculates acquisition probabilities. The WebSocket notification generator 540 creates update messages that are transmitted to the client interface updater 550. Simultaneously, the blockchain record manager 560 ensures all transactions are recorded on the distributed ledger.

Figure 6:
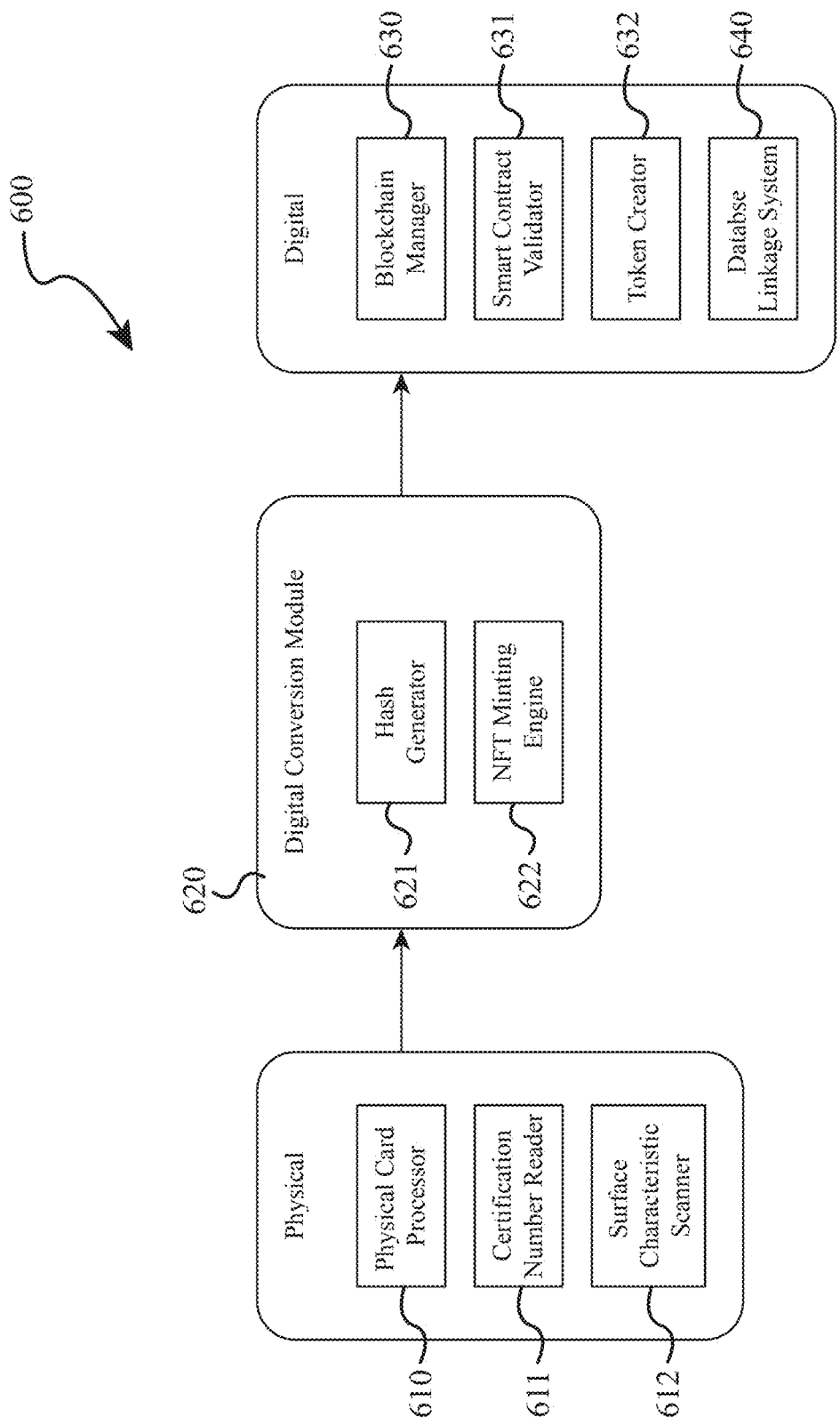
FIG. 6 is an integration diagram in accordance with an embodiment showing the linkage between physical trading cards and their digital representations, illustrating the workflow from physical card processing through digital conversion, NFT minting, and blockchain validation that ensures secure authentication of ownership.

FIG. 6 depicts the physical-digital integration system 600 in accordance with an embodiment that creates verifiable links between physical cards and their digital representations. The physical card processor 610 captures certification numbers through the reader 611 and surface characteristics through the scanner 612. The digital conversion module 620 generates cryptographic hashes through the generator 621 and mints NFTs through the engine 622. The blockchain manager 630 validates ownership through the smart contract validator 631 and creates tokens through the creator 632. The database linkage system 640 maintains synchronized records across the platform.

In accordance with aspects of the system in an embodiment, the processes associated with selecting trading cards and repackaging them in a separate package is an integral part of the system's continuous replenishment mechanism. This process begins with the system analyzing the current inventory to identify the most desirable cards based on factors such as rarity, condition, and market demand.

In accordance with a method embodiment of the invention, a user of the system performs the step of selecting an initial card 1001. In accordance with an exemplary embodiment, once the cards are selected, they are virtually allocated to a new package, which is then made available for purchase through a representation of the cards included in the new package 300 upon digital interface, depicted in an example by FIG. 2. This repackaging process is primarily digital in an exemplary embodiment as depicted in an example by FIG. 2, as the physical cards remain in their secure storage location. The system updates the digital representation of the cards included in the new package 300 in real-time, reflecting the newly created package and its contents. This allows for rapid adjustments to the offerings without the need for physical handling of the cards, minimizing potential damage and streamlining the process.

The newly created package comprising the representation of the cards included in the new package 300 is then integrated into the system's user interface, optionally further comprising detailed descriptions of each card, their individual odds of acquisition, and any relevant historical or condition information in an example. This ensures that consumers have full transparency regarding the contents of the repackaged product before making a purchase. In accordance with an embodiment, the odds of receiving repackaged cards in a package and the availability of these repackaged cards are continuously updated and displayed upon a user interface to reflect any changes in inventory or market conditions, reflecting the benefits of accuracy and transparency that the system affords.

At the core of this system is the enhanced transparency feature, which allows consumers to view the exact cards they can receive prior to purchase. Each card within the system is displayed with specific odds, detailing the likelihood of obtaining each card. This level of detail is provided for every card included in the system, ensuring that consumers are fully informed about their potential acquisitions. This transparency is crucial in building trust and satisfaction among consumers, as it eliminates the uncertainty and perceived unfairness that can accompany traditional card trading practices.

The enhanced transparency feature of this system is a pivotal innovation that addresses long-standing issues in the trading card market. This feature allows consumers to view detailed information about each card before making a purchase. Specifically, the system displays each card along with the specific odds of obtaining it, which are calculated based on a proprietary algorithm that takes into account factors such as card rarity, demand, and previous acquisition rates. This algorithm is regularly updated to reflect current market conditions, ensuring that the odds are always accurate and relevant.

Furthermore, the system provides a comprehensive description of each card, including its history, condition, and any other relevant attributes that might influence its value. This information is verified through a rigorous authentication process, which involves physical inspection and comparison against known standards. By providing this level of detail, the system not only enhances transparency but also empowers consumers to make informed decisions based on their preferences and the potential value of the cards.

In a method associated with the implementation of the system, the following steps relevant to the transparency feature are performed in an example.

Collecting and analyzing comprehensive data on each card forms the foundation of the system, encompassing historical transaction data, condition reports, and market demand. This crucial step involves analyzing the gathered data to determine the initial odds of obtaining each card, which are prominently displayed to the consumer.

Calculating the odds involves implementing a sophisticated algorithm that takes into account various factors such as card rarity, historical demand, and transaction frequency. The odds are dynamically updated in real-time, reflecting ongoing market analysis and consumer interactions to ensure accuracy and relevance.

Authenticating each card and compiling detailed descriptions is another step. Every card undergoes a thorough authentication process to verify its authenticity and condition. Detailed descriptions, complete with images and significant historical information, are compiled for each card. This comprehensive information is then made accessible to consumers through the system interface.

Presenting a user-friendly digital interface is another step associated with a method embodiment, an example of which is presented as FIG. 2, during which the steps of displaying each card along with its odds, detailed description, and high-quality images may take place. This user interface enables consumers to easily browse and understand the offerings, facilitating informed purchasing decisions.

Collecting feedback and making adjustments based on consumer feedback and interaction data is the final step, which results in the continuous refinement of the odds calculation algorithm and card descriptions. Adjustments are made on an ongoing basis to ensure that the system remains accurate and relevant to consumer needs and market trends, thereby enhancing the overall user experience and satisfaction.

The following steps associated with an embodiment of the system reflect its approach for selecting, formulating, and distributing trading card packs within a Slab Pack system. This process begins with the selection of cards from both physical and digital warehouses, where cards are evaluated based on their market value, rarity, and condition. Following this, the packs are strategically formulated by combining various card components across different tiers to optimize both profitability for the company and value for the customer. Once the packs are assembled, they are distributed to customers, and the inventory checklist is continuously updated to reflect current card availability. This ensures transparency and maintains customer trust by accurately representing the pack contents available for purchase.

Selecting the card or cards for the package including the initial card 1001, involves a selection process that leverages both a physical and digital warehouse full of cards. The value of each card, determined by historical sales data, market demand, and intrinsic attributes such as rarity and condition, is presented to a user via a user interface and thus plays a role in this selection process. Assessing the value of each card ensures that the packs are formulated to meet specific price points and customer expectations.

Formulating the packs involves combining multiple components for each tier of product offering. This process begins with selecting a diverse array of cards that together optimize both the profit for the company and the value delivered to the customer. The system employs algorithms to dynamically adjust the composition of tiers based on real-time market data and inventory levels, ensuring that each pack remains competitive and appealing to consumers.

In accordance with an embodiment, the pack selection process incorporates true randomness using the Fisher-Yates (Knuth) Shuffle Algorithm. This algorithm ensures an unbiased and random selection of cards for all different tiers within each pack. The process involves initializing an array with all available cards in a specific tier, the tier optionally chosen in accordance with desired characteristics of each card to be encompassed within, then starting from the last element and swapping it with a randomly selected element from the whole array, including the last element itself. This step is repeated for all elements, moving from the last to the second element. The resulting shuffled array provides a random order of cards, from which the required number of cards are selected from the beginning to form the pack. This randomization process is applied separately for each tier within a pack, ensuring a fair and unpredictable distribution of cards across all value levels. The use of the Fisher-Yates algorithm guarantees that each card has an equal probability of being selected, maintaining the integrity and excitement of the pack opening experience. Once the cards are selected and aggregated into packs based on their respective tiers, they are ready for distribution to customers. Following distribution, the system continuously updates the checklist of available cards to reflect the current inventory, maintaining transparency with customers and allowing for real-time adjustments to product offerings based on sales data and inventory levels.

The step of a user purchasing a package of cards from a series of cards 1002 also takes place in accordance with a method embodiment. In association with such step, the method further comprises the steps of formulating the packs into organized tiers or series in association with embodiments of the system involves a process that combines multiple components to create differentiated product offerings. Each tier is crafted to cater to varying customer preferences and price points, ensuring a broad appeal across different segments of the market. The process starts by categorizing cards based on their value, rarity, and overall market demand. These categories form the basis of each tier, with higher tiers containing rarer or more valuable cards. The selection for each tier is then enhanced by incorporating a mix of cards that together optimize the perceived value and potential return for the customer. This methodical combination of components within each tier is crucial for balancing customer satisfaction with profitability. Additionally, the system employs algorithms to dynamically adjust the composition of tiers based on real-time market data and inventory levels, ensuring that each pack remains competitive and appealing to consumers. This approach not only streamlines the pack formulation process but also ensures that each tier is consistently aligned with current market trends and customer expectations.

The step of reducing the amount of available cards in the series 1003 then takes place in accordance with a method embodiment. This step may comprise formulating the packs requires combining multiple components for each tier of product offering. This involves selecting a diverse array of cards that together optimize both the profit for the company and the value delivered to the customer. The process of pack formulation is a balancing act that aims to meet customer expectations while maintaining profitability. Each pack is designed to offer a specific range of potential value, ensuring that customers feel they are receiving fair value for their investment. Aggregating the cards into packs is another step associated with embodiments of the system. This involves physically and digitally organizing the cards into predetermined configurations based on the tier and value criteria previously established. Once the cards are aggregated and packed, they are ready to be distributed to customers. Following distribution, a checklist of available cards is continuously updated to reflect the current inventory. This dynamic updating process maintains transparency with customers and for adjusting the product offerings based on real-time sales data and inventory levels. Once a pack is formulated and sold to the consumer, the cards that were included in the pack are then removed from the available cards in the series, thereby reducing the amount of available cards in the series.

A method embodiment further comprises updating the hit rates of each card by replenishing a series with fresh cards 1004. In accordance with such step, the system's user interface in an embodiment comprises a visual representation of a transparent and informative checklist of available cards. This checklist not only lists the cards available for purchase but also prominently displays the odds associated with each card, such as a 1 in 1000 chance of obtaining a particularly valuable card. The odds, or hit rate, associated with the availability of each card is updated based on the relative value of a given card added to a series. In accordance with various embodiments, cards are included within a series based on their value, and the impact that the card will have to bring the value of a card to a desired average value of the series. In various embodiments, this information is presented to users via a user interface associated with the system. This level of transparency is instrumental in setting consumer expectations and building trust, as users can make informed decisions based on the likelihood of receiving specific cards.

In accordance with an embodiment of the system, the step of updating and displaying the updated hit rates and odds to a user 1005 takes place. In accordance with various embodiments, this step is performed with the aid of a checklist visually presented to a user via a user interface. Implementing the checklist in an embodiment comprises integrating the checklist into the user interface in a way that is both intuitive and informative by presenting the odds, hit rate, and other information associated with each card available in a series, presented as a checklist. The system in an embodiment dynamically updates the checklist in real-time, reflecting changes in card availability and odds as cards are acquired by other users and inventory shifts additionally reflecting fresh cards added to a series. This real-time updating ensures that the information presented to the user is always accurate and current, preventing any discrepancies that could affect user satisfaction.

A method embodiment therefore additionally comprises the step of reflecting changes and changing checklists in real time via the user interface 1006 as activities take place in real-time among cards in a series and among other users of the system. This dynamic updating is part of the continuous replenishment process for each aeries of cards. For instance, in accordance with the above-presented steps, if a series comprises 100 cards and each Slab Pack contains 2 cards, the purchase of a pack reduces the number of cards in the Series to 98. Immediately following the user's checkout, the system replenishes the 2 cards that were purchased with 2 fresh ones, restoring the total number of cards in the series back to 100. This ensures that anyone coming to buy a pack from that series will always see 100 cards available, maintaining a consistent offering unless the inventory runs low. At that point, the continuous replenishment will pause, and this change will be reflected in the system. Additionally, as the total number of cards in a series fluctuates, the associated hit rate per card is adjusted accordingly. These updates are made live, ensuring full transparency at all times for the users in accordance with this method step embodiment and embodiments of the related system.

The presentation of the checklist is designed to be user-friendly, with clear categorizations and visual indicators that highlight the rarity and value of the cards. Each card's odds are displayed next to its listing, allowing users to easily understand their chances of obtaining each card before making a purchase. This method of presentation not only enhances the user experience by making the information easily accessible but also helps in maintaining a high level of engagement by clearly outlining the potential rewards.

Furthermore, the checklist serves as a tool in accordance with embodiments of the system for managing user expectations and fostering a sense of fairness and transparency within the system. By clearly displaying the odds and providing a detailed view of the available cards, the system ensures that users feel informed and valued, which in turn can lead to increased customer loyalty and satisfaction.

Updating the checklist involves monitoring which cards are included in each distributed pack and adjusting the inventory records accordingly. This ensures that the checklist always reflects the actual cards available for future packs. The continuous updating of the checklist is essential for maintaining customer trust and for ensuring the accuracy of the pack contents that are advertised. By integrating the above steps, the system in an embodiment ensures a seamless operation from card selection to pack formulation and customer distribution, all while maintaining a dynamic and accurate inventory system.

Another key aspect of embodiments of the invention is a continuous replenishment mechanism. Unlike traditional methods where the selection of available cards remains largely unchanged until new batches are released, this system ensures that the card inventory is constantly updated. This dynamic replenishment process keeps the card selection fresh and engaging for consumers, encouraging repeated interactions and sustained interest in the product offerings. The system automatically updates the inventory based on predefined algorithms that take into account consumer demand, prices of cards and the desired prices of cards within a given series, market trends, and inventory levels.

The continuous replenishment mechanism featured in embodiments represents a significant advancement over traditional trading card distribution methods. Traditionally, the selection of available cards in the market remains static until new batches are released, which can lead to decreased consumer interest over time as the novelty and excitement diminish. In contrast, an embodiment of the invention incorporates a dynamic replenishment process that ensures the card inventory is consistently refreshed and updated.

This mechanism in an example operates in accordance with a method resulting in an outcome where the inventory of available cards is automatically updated. It utilizes predefined algorithms that analyze various factors such as consumer demand, market trends, and current inventory levels. By continuously monitoring these elements, the system can make informed decisions about which cards to introduce or replenish, ensuring that the offerings remain relevant and appealing to consumers. This not only keeps the card selection fresh but also encourages repeated interactions and sustained interest, enhancing the overall consumer experience and engagement with the product.

Implementing the continuous replenishment mechanism begins with monitoring market conditions, continuously collecting data on market trends, individual card prices, consumer demand, and inventory levels using analytics tools. The analytics tools utilized in association with embodiments of the invention are capable of processing large volumes of data to identify patterns and shifts in consumer behavior and market dynamics. Utilizing predefined algorithms follows, analyzing the collected data to make informed decisions about inventory adjustments. These algorithms are specifically designed in accordance with embodiments of the system to optimize the selection of cards based on current market conditions, desired average price within a series, and consumer preferences, ensuring that the inventory is always aligned with consumer demand.

Implementing automated systems to update the inventory based on the outputs of the algorithms follows in accordance with a method embodiment. This involves digital management of the inventory where the virtual representation of cards is adjusted without physical movement, allowing for rapid updates to inventory levels. Establishing a feedback loop that incorporates consumer feedback directly into the replenishment process is crucial. This feedback is used to further refine the algorithms and ensure that the system remains responsive to consumer needs. The physical location of the cards remains static unless they are retrieved for packing and shipping, ensuring that the physical handling of cards is minimized and does not influence their allocation in the packs.

The step of continuously improving by regularly reviewing and updating the algorithms and processes involved in the replenishment mechanism is then performed to incorporate new insights and improvements. This ensures that the system evolves with the market and continues to meet the high standards of efficiency and responsiveness required, maintaining a dynamic and engaging consumer experience.

The system in an embodiment implements a distributed database architecture utilizing a specialized schema optimized for real-time trading card management. The primary database cluster maintains multiple coordinated tables including: CardInventory for tracking current card quantities and status; TransactionHistory for maintaining a complete record of all card acquisitions and transfers; and MarketMetrics for storing real-time pricing and demand data. In an embodiment, the system implements a real-time inventory management and odds calculation mechanism through a distributed computing architecture. The system maintains a primary database cluster that stores current card inventory, transaction history, and market analysis data. A dedicated calculation engine continuously monitors inventory changes and executes the odds recalculation algorithm whenever a card acquisition occurs. The algorithm factors in remaining card quantities, historical transaction patterns, and target distribution rates to generate updated odds values.

The system maintains persistent bidirectional communication channels through a dedicated connection manager that coordinates all client-server interactions. The connection manager implements an event-driven architecture where inventory changes trigger immediate notifications to all connected clients. The system employs WebSocket protocols to enable real-time bidirectional communication between the server and client interfaces. When inventory changes occur, the WebSocket connection pushes immediate updates to all connected client interfaces, ensuring odds displays remain synchronized across the platform. This technical implementation eliminates latency issues present in traditional polling-based systems.

The system in an embodiment utilizes a supplementary blockchain integration layer specifically for providing external verification of card ownership transfers between user showrooms. While the primary transaction processing and data management occurs within the database system, the blockchain layer provides an additional public ledger for tracking ownership history The blockchain integration utilizes a hybrid on-chain/off-chain architecture to optimize performance while maintaining security. Card metadata and ownership records are stored on-chain through smart contracts, while high-frequency inventory and odds calculations are processed off-chain and periodically committed to the blockchain. Each physical card is assigned a unique digital identifier generated through a cryptographic hashing algorithm that incorporates the card's grading certification number and physical characteristics. This identifier is then used to mint a corresponding NFT on the blockchain.

The ownership verification system in an embodiment implements a multi-stage authentication protocol that leverages both database and blockchain records. When validating a card transfer, the system first verifies the transaction details in the primary database, then updates the public blockchain record to reflect the ownership change between showrooms.

The blockchain integration layer in an embodiment implements smart contracts that manage NFT tokens and validate ownership transfers. The system includes specialized components for reading certification numbers, scanning physical card characteristics, generating cryptographic hashes, and minting NFT tokens.

The continuous replenishment mechanism employs an automated workflow engine that monitors inventory levels against predetermined thresholds. When a card series drops below its threshold, the system automatically initiates the replenishment process by: 1) analyzing current market conditions and pricing data, 2) calculating optimal new card quantities to maintain target odds distributions, 3) generating unique identifiers for new cards, and 4) updating the blockchain records and digital interface displays. This automated process ensures consistent market engagement while maintaining the integrity of card rarity and value.

The system implements a secure synchronization protocol between physical card inventory and digital representations.

When physical cards are authenticated and graded, the system generates a digital twin record containing detailed card attributes, condition assessment data, and high-resolution imagery. This record is cryptographically linked to both the physical card's certification number and its blockchain token ID, creating an immutable chain of custody that validates authenticity and ownership transfers.

The real-time inventory and odds display system implements a comprehensive user interface that dynamically renders available trading cards and their current acquisition odds. The system maintains an active WebSocket connection that enables immediate server-push updates whenever inventory changes occur within the system. When a card acquisition takes place, the system executes an automated sequence where it first decrements the available inventory count in the database, then initiates the recalculation algorithm to determine updated odds for all remaining cards based on the new inventory levels. These updated odds values are immediately pushed to all connected client interfaces through the established WebSocket connection, ensuring all users see synchronized, current data. The interface automatically refreshes to display the new odds and availability information, providing users with real-time visibility into the current state of card inventory.

The physical-digital integration system employs a sophisticated multi-layer authentication protocol that creates an unbreakable link between physical cards and their digital representations. Each physical card receives a unique identifier that combines multiple authentication elements, including its formal grading certification number, high-resolution scan data capturing detailed card characteristics, and specific physical attributes such as surface patterns and edge conditions. This comprehensive identifier serves as the foundation for minting a corresponding NFT on the blockchain, creating an immutable digital twin of the physical asset. Smart contracts deployed on the blockchain validate all ownership transfers by performing dual verification of both the physical card certification and the associated NFT token. The system maintains a permanent and unalterable audit trail of all transfers and authentications, ensuring complete transparency and traceability throughout the card's lifecycle.

The continuous replenishment mechanism operates through a sophisticated automated workflow system that constantly monitors inventory levels against predefined thresholds. When an inventory threshold is reached, the system initiates a comprehensive analysis of current market conditions, including transaction volumes, price trends, and demand patterns. Based on this analysis, the system calculates optimal quantities for new card introductions that will maintain desired distribution rates while preserving the inherent rarity and value of existing cards. The system then generates unique identifiers for each new card being introduced, updates all relevant blockchain records to reflect the inventory changes, and refreshes all interface displays to show the updated card availability. This automated process ensures consistent market engagement while maintaining the integrity of the trading card ecosystem.

The dynamic pricing system incorporates a sophisticated market analysis engine that continuously monitors and evaluates real-time transaction volumes, price trends across different card categories, and evolving demand patterns. The system processes this market data to execute automated price adjustments based on current inventory levels, overall market conditions, and predetermined target price points within each card series. These adjustments are implemented through smart contracts that ensure all price updates are executed consistently across the platform while maintaining a complete audit trail of all pricing changes. The system's integration with blockchain technology ensures that all price adjustments are transparent and verifiable, while the automated nature of the process enables rapid response to changing market conditions.

The technical implementation leverages a distributed computing architecture that ensures scalability and reliability. The system maintains a primary database cluster for storing current card inventory, transaction history, and market analysis data, while employing dedicated calculation engines for continuous monitoring and execution of the odds recalculation algorithms. The WebSocket protocol implementation enables true real-time bidirectional communication between servers and clients, eliminating the latency issues common in traditional polling-based systems. The hybrid on-chain/off-chain architecture optimizes performance while maintaining security, with card metadata and ownership records stored on-chain through smart contracts while high-frequency inventory and odds calculations are processed off-chain and periodically committed to the blockchain.

In the preferred embodiment, the system further comprises digital and physical elements to enhance the trading card experience. Each card is associated with a digital counterpart, which can be accessed online. This digital representation includes a Non-Fungible Token (NFT) for each card, which facilitates ownership tracking and authenticity verification. The physical cards are stored in a secure location and are linked to their digital versions through a unique identification system that includes a grading certification number. This dual-layer approach not only secures the transaction process but also adds an additional layer of value to the cards.

In the preferred embodiment of the invention, the integration of digital and physical elements plays a crucial role in enhancing the overall trading card experience. This dual-layer approach involves each physical card being paired with a digital counterpart, accessible online. The digital representation of each card includes a Non-Fungible Token (NFT), which serves multiple functions: it facilitates the tracking of ownership, enhances the security of transactions, and aids in the verification of each card's authenticity. This digital layer ensures that all transactions are transparent and traceable, providing a robust mechanism against fraud and counterfeiting.

In concert with the digital elements, the physical cards are securely stored in a controlled environment, meticulously cataloged, and linked to their digital versions through a unique identification system. This system utilizes a grading certification number for each card, which not only confirms the card's condition and authenticity but also ties it directly to its digital representation. This linkage is crucial for maintaining the integrity of both the physical and digital aspects of the card. The grading certification number acts as a bridge between the two realms, ensuring that any transaction or change in ownership in the digital domain is accurately reflected in the physical domain.

The steps described below reflect a method relevant to the system for integrating digital and physical elements within a trading card system. This method can be implemented as a standalone process or as a subset of steps within a broader system designed to enhance the trading card experience. By creating digital representations of physical cards, linking these elements through unique identifiers, securing physical storage, synchronizing transactions across platforms, and maintaining system integrity, this method ensures a seamless and secure integration of digital and physical assets. This integration not only enhances the security and transparency of transactions but also significantly improves the overall user experience by providing a robust framework for managing and verifying trading card authenticity and ownership.

Creating digital representations involves generating a digital counterpart for each physical card, which includes encoding detailed information about the card into a Non-Fungible Token (NFT). This NFT is then registered on a blockchain or similar decentralized digital ledger, ensuring the integrity and security of the data. Linking digital and physical elements follows, with each physical card being assigned a unique grading certification number. This number is used to link the physical card to its digital representation through a secure database that maps each grading certification number to its corresponding NFT.

In an exemplary embodiment, the database comprises a database schema to manage the relationships between various elements of the trading card distribution process, including groupings of cards into packs also referred to as "Slab Packs" used for the schema terminology as referred to in the following. In accordance with an exemplary embodiment, this schema includes tables for Cards, Orders, SlabPack-OrderRefill, SlabPackCategory, SlabPackSeries, SlabPack-Tier, and SlabPackComponent, each with specific fields designed to track and manage different aspects of the system. In an exemplary embodiment, the field names described herein reflect their actual function in the context of the embodiment of the invention. The database schema in an embodiment is optimized for managing relationships between various elements of the trading card distribution process.

The Card table, in accordance with an exemplary embodiment, includes fields such as slabPackStatus (with states like active, queued, disabled, or none), slabPack SeriesId, slabPackTierId, and slabPackComponentId. These fields allow for tracking of each card's status within the system and its association with specific packs and series.

The SlabPackSeries table in accordance with an exemplary embodiment incorporates fields like numPremiumCardsPerPack, numNonPremiumCardsPerPack, remainingPacks, isActive, is Visible, and isEditable. These fields enable fine-grained control over the composition and availability of each series, supporting the dynamic nature of the system.

In an embodiment, the system comprises an implementation of a state machine to manage the lifecycle of SlabPackSeries. This state machine defines five distinct states: hidden, editable, sold_out, sold_out_editable, and active. Transitions between these states are governed by specific actions such as ACTIVATE, DEACTIVATE, SHOW, HIDE, EDIT, and LOCK. In an embodiment, the name of the action reflects its actual functionality. This state management system ensures that the SlabPackSeries progresses through its lifecycle in a controlled and predictable manner.

The system in accordance with an embodiment implements a distributed database architecture (400) utilizing a specialized schema optimized for real-time trading card management. The primary database cluster (410) maintains multiple coordinated tables including: CardInventory (411) for tracking current card quantities and status; TransactionHistory (412) for maintaining a complete record of all card acquisitions and transfers; and MarketMetrics (413) for storing real-time pricing and demand data. The database implements horizontal sharding based on card series to optimize query performance across large card collections while maintaining ACID compliance for all transactions.

The system in a preferred embodiment utilizes a supplementary blockchain integration layer specifically for providing external verification of card ownership transfers between user showrooms. While the primary transaction processing and data management occurs within the database system, the blockchain layer provides an additional public ledger for tracking ownership history. Each physical card's unique identifier is generated through a hash generator that incorporates the card's grading certification number and physical characteristics. This identifier is used for minting corresponding NFT tokens that serve as public proof of ownership transfers.

The ownership verification system implements a multi-stage authentication protocol that leverages both database and blockchain records. When validating a card transfer, the system first verifies the transaction details in the primary database, then updates the public blockchain record to reflect the ownership change between showrooms. The system maintains separate verification queues for different transaction types to optimize throughput while ensuring data integrity across both the primary database and supplementary blockchain ledger.

The WebSocket implementation in accordance with an embodiment utilizes a dedicated connection manager (420) that maintains persistent bi-directional communication channels between the server and all connected client interfaces through connection handlers (421). The connection manager implements an event-driven architecture where inventory changes trigger immediate push notifications through the message queue (422) to all relevant clients. The system employs a custom protocol for WebSocket messages that includes message type identifiers for different update categories, payload compression for efficient data transmission, and automatic reconnection handling to prevent data loss during temporary disconnections.

The blockchain integration layer (430) in accordance with an embodiment implements a hybrid architecture that combines on-chain smart contracts with off-chain processing for optimal performance. The smart contract manager (431) and NFT token manager (432) handle token minting for new cards, ownership transfer validation, and maintenance of the immutable transaction history. Each physical card's unique identifier is generated through the hash generator (621) that incorporates the card's grading certification number, high-resolution scan data, and physical characteristics captured by the surface characteristic scanner (612). This identifier serves as the basis for minting the corresponding NFT token through the token creator (632).

The NFT verification system in accordance with an embodiment implements a multi-stage authentication protocol through the blockchain manager (630). When validating a card transfer, the smart contract validator (631) verifies the NFT token ownership on the blockchain, confirms the match between the physical card's certification number and the token metadata, validates the card's physical characteristics against the stored hash, and updates the ownership records in both the blockchain and primary database through the database linkage system (640). The system maintains separate verification queues for different transaction types to optimize throughput while ensuring transaction integrity.

The system employs dedicated processing nodes (440) for handling high-frequency operations like odds calculations through the odds calculation engine (441) and inventory updates through the inventory manager (442). These nodes maintain local caches of relevant data while periodically synchronizing with the primary database cluster (410). The caching layer implements a write-through strategy for inventory changes to ensure consistency, while using a time-based invalidation scheme for derived data like odds calculations. This architecture enables real-time responsiveness while maintaining data integrity across the distributed system.

In accordance with an exemplary embodiment, the system employs a series of workers to manage various aspects of the SlabPackSeries lifecycle. The SlabPackQueueRefillerDispatcherWorker, for example, runs every 30 seconds to identify SlabPackSeries that need refilling and dispatches jobs to the SlabPackQueueRefillerWorker. This worker then drafts orders and queues cards for refill, ensuring that the system maintains the desired inventory levels for each series.

in accordance with an exemplary embodiment, another worker is the SlabPackCheckoutExpireWorker, which addresses scenarios where Stripe checkout sessions might not send events upon user cancellation or session expiration. This worker ensures that cards reserved as part of a slabpack are released back to the available pool if a purchase is not completed within a specified timeframe.

In accordance with an exemplary embodiment, various aspects of the system integrates with Stripe for payment processing, utilizing Stripe Checkout to handle payments for pack purchases. This integration in an embodiment includes handling various webhook events such as checkout.session.expired, checkout.session.completed, checkout.session, payment_succeeded, and checkout.session, payment_failed. In an exemplary embodiment, the name of each webhook event reflects its functionality.

To support real-time updates, an embodiment of the system incorporates WebSocket technology, allowing for push notifications to users about events as they happen. This feature is particularly important for maintaining the transparency of the system, especially when high-value collectibles such as desirable cards are purchased.

In accordance with an exemplary embodiment, the system's API is divided into admin (BackStage) and user-facing (FrontStage) endpoints. The admin API includes endpoints for managing SlabPackSeries, SlabPackCategories, SlabPackTiers, and SlabPackComponents, providing comprehensive control over all aspects of the system. The FrontStage API includes endpoints for users to interact with SlabPackSeries, including creating checkout sessions and retrieving series details. In accordance with varying embodiments, the system comprises a robust framework for implementing the novel trading card distribution system, ensuring its scalability, reliability, and real-time responsiveness to market dynamics and user interactions.

The method for managing digital trading card distribution in a preferred embodiment is implemented through a comprehensive system architecture that enables real-time display and updates of trading card inventory and associated acquisition odds. The digital interface is maintained through a user interface layer that renders available trading cards and their current acquisition odds in an interactive format. The interface connects to the system's backend through persistent bidirectional communication channels that enable immediate server-push updates whenever inventory changes occur within the system. The continuous replenishment mechanism in an embodiment operates through an automated monitoring system that tracks inventory levels against predetermined thresholds stored in the card inventory database. When inventory reaches a defined threshold, the system automatically initiates the replenishment process by analyzing current market conditions through the market metrics database, calculating optimal quantities for new card introductions, and generating unique identifiers for each new card being added to the system. The unique identifiers are created through a cryptographic hashing algorithm that incorporates multiple authentication elements including certification numbers and physical characteristics.

The system in an embodiment maintains persistent bidirectional communication channels through a dedicated connection manager that coordinates all client-server interactions. The connection manager implements an event-driven architecture where inventory changes trigger immediate notifications to all connected clients. The system employs a custom messaging protocol that includes distinct message types for different update categories, payload compression for efficient data transmission, and automatic reconnection handling with message queuing to prevent data loss during temporary disconnections.

The authentication process for physical trading cards in an embodiment begins with the capture of certification numbers and surface characteristics through specialized scanning equipment. The system generates unique digital identifiers by applying cryptographic hash functions to this authentication data, creating an immutable link between the physical card and its digital representation. These identifiers serve as the foundation for minting non-fungible tokens (NFTs) on the blockchain network, with smart contracts managing the validation of ownership transfers by verifying both the physical card certification and the associated NFT token data.

The dynamic interface updating process in an embodiment is triggered by card acquisitions, which initiate a sequence of automated actions. The system first decrements the available inventory count in the database, then executes the odds recalculation algorithm to determine updated acquisition probabilities for all remaining cards based on the new inventory levels. These updates are immediately transmitted to all connected client interfaces through the established communication channels, ensuring all users have synchronized access to current inventory and odds data.

The system in an embodiment maintains persistent bidirectional communication channels through a dedicated connection manager that coordinates all client-server interactions. The connection manager implements an event-driven architecture where inventory changes trigger immediate notifications to all connected clients. The system employs a custom messaging protocol that includes distinct message types for different update categories, payload compression for efficient data transmission, and automatic reconnection handling with message queuing to prevent data loss during temporary disconnections.

The system in an embodiment comprises an integrated digital wallet functionality that enables users to maintain and manage funds received from successful sales transactions within the platform ecosystem. This wallet serves as an internal account balance system where proceeds from card sales are automatically credited and held until the user initiates a withdrawal. The wallet functionality specifically eliminates the need for users to repeatedly provide external payment credentials or initiate new funding transactions from external accounts or credit cards for each purchase, as users can utilize their accumulated sale proceeds for subsequent transactions within the system. This streamlined approach maintains the security benefits of the blockchain-based transaction system while reducing friction in the trading process.

The wallet functionality in an embodiment is specifically configured to hold and manage non-blockchain assets, particularly fiat currency such as United States dollars, in addition to managing blockchain-based assets. When users complete successful sales transactions on the platform, the proceeds in US dollars are automatically credited to their wallet balance and held in a dedicated account within the system. This configuration enables users to maintain liquid fiat currency funds within the platform ecosystem while still benefiting from the security and authentication features provided by the blockchain integration layer for trading card transactions. The system implements appropriate financial controls and security measures to ensure proper segregation and management of fiat currency holdings separate from blockchain assets, while maintaining seamless integration for users to utilize either type of funds for transactions within the platform.

The distributed database architecture in an embodiment implements horizontal sharding based on card series to optimize query performance across large collections while maintaining transactional integrity. The architecture comprises multiple coordinated databases including the card inventory database for tracking current quantities and status, the transaction history database for maintaining complete records of all acquisitions and transfers, and the market metrics database for storing real-time pricing and demand data.

The processing nodes responsible for odds calculations and inventory updates in an embodiment maintain local caches of frequently accessed data while implementing a periodic synchronization protocol with the primary database cluster. The caching layer uses a write-through strategy for inventory changes to ensure consistency, while employing a time-based invalidation scheme for derived data such as odds calculations. This architecture enables the system to maintain real-time responsiveness while preserving data integrity across the distributed platform.

The blockchain integration layer in an embodiment implements smart contracts that manage NFT tokens and validate ownership transfers. The system includes specialized components for reading certification numbers, scanning physical card characteristics, generating cryptographic hashes, minting NFT tokens, and validating ownership transfers through smart contracts. This integration ensures secure and verifiable tracking of card ownership while maintaining the connection between physical cards and their digital representations.

The system maintains ownership records primarily within its database architecture, with the blockchain layer providing external verification of transfers between user showrooms. Each physical card's unique identifier is generated through a cryptographic hashing algorithm that incorporates the card's grading certification number and physical characteristics. This identifier is used to mint a corresponding NFT specifically for tracking ownership transfers between showrooms Maintaining system integrity is an additional step performed in association with embodiments of the system, where the digital NFTs and the physical cards remain secure and accurate. This includes periodic checks to verify that the grading certification numbers are correctly matched with their corresponding digital tokens, ensuring the system's overall reliability and trustworthiness.

The ownership verification system implements a multi-stage authentication protocol that leverages both database and blockchain records. When validating a card transfer, the system first verifies the transaction details in the primary database, then updates the public blockchain record to reflect the ownership change between showrooms. The system maintains separate verification queues for different transaction types to optimize throughput while ensuring data integrity across both the primary database and supplementary blockchain ledger.

The pricing model within this system is designed to balance profitability with consumer value. Cards are categorized into different price points based on their market value and rarity. In accordance with embodiments, only cards of desired price point, market value and rarity characteristics are included within a given series designed in association with such desired attributes. This structured pricing ensures that consumers can make purchases that align with their expectations and budget, while also allowing the company to maintain a profitable operation. The system offers various price tiers, making it accessible to a wide range of consumers.

Associated methods of development of the pricing model associated with the system comprise some or all of the following steps: Establishing a structured pricing model within the system involves categorizing cards into groupings or series of different price points based on their market value and rarity. This categorization process is crucial for aligning the product offerings with consumer expectations and budget constraints. By assessing each card's market demand, historical sales data, and unique attributes such as rarity and condition, the system can accurately assign cards to appropriate price tiers. This ensures that consumers have a variety of purchasing options that reflect both the intrinsic value of the cards and their own investment capabilities.

Implementing dynamic pricing strategies is another key step in balancing profitability with consumer value. The system utilizes advanced algorithms to continuously analyze market trends and adjust the pricing tiers accordingly. This dynamic adjustment helps in maintaining competitive pricing that attracts a broad consumer base while ensuring that the company remains profitable. The algorithms take into account factors such as changes in consumer demand, fluctuations in market conditions, and inventory levels to optimize pricing in real-time.

Offering various price tiers, optionally as series, is essential for making the system accessible to a wide range of consumers. Each tier is designed to offer a different level of value, catering to both budget-conscious buyers and premium collectors. This tiered approach not only broadens the market reach but also enhances consumer satisfaction by providing options that suit diverse financial situations and collecting goals. The system ensures that each tier is clearly defined and consistently updated to reflect the current market conditions, thereby maintaining transparency and trust with consumers.

By following these method steps, the system in a preferred embodiment effectively implements a pricing model that balances profitability with consumer value. The structured categorization of cards, coupled with dynamic pricing strategies and a tiered offering, ensures that the system can adapt to changing market dynamics while meeting the needs of a diverse consumer base.

The preferred embodiment of the system provides several novel benefits to the trading card market by integrating several key features that transform consumer interactions and perceptions of value. By providing transparent odds, embodiments of the system ensure that consumers have clear expectations about their potential winnings, enhancing trust and satisfaction. The continuous updating of card selection keeps the offerings fresh and aligned with market trends, encouraging ongoing engagement. Additionally, the integration of digital elements with physical cards in accordance with embodiments bridges the gap between traditional collecting and modern technology, offering a seamless and secure experience. Together, these features present the system as a solution poised to enhance core aspects of participation within the trading card industry.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

We claim:

1. A method for managing digital trading card collectible item distribution, comprising:
    maintaining, by a computing system, a digital interface displaying available trading cards and associated acquisition odds in real-time acquisition odds for each individual collectible item before purchase;
    implementing a continuous replenishment mechanism comprising:
    monitoring inventory levels of the collectible items against predefined thresholds;
    automatically replenishing a series with replacement collectible items when inventory falls below predetermined thresholds;
    automatically calculating updated recalculating and updating odds for all remaining collectible items in real time based on current inventory levels specific replacement collectible items added to the series;
    generating unique identifiers for new cards when thresholds are reached;
    dynamically updating the digital interface to reflect inventory and odds changes;
    establishing persistent bidirectional communication channels between the computing system and client devices comprising;
    transmitting, via the communication channels, immediate updates to all connected client interfaces when inventory changes occur using an event-driven architecture triggering immediate odds recalculation upon each acquisition of a collectible item or a plurality of collectible items;
    wherein the continuous replenishment mechanism improves computer functionality by enabling real-time synchronization of inventory data and odds calculations across distributed client interfaces while maintaining transparent odds display for collectible item acquisition.

2. The method of claim 1, wherein the persistent bidirectional communication channels comprise WebSocket connections implementing:
    connection handlers maintaining persistent communication pathways with automatic reconnection protocols;
    an event-driven architecture for inventory change notifications triggered by an acquisition of a collectible item or a plurality of collectible items;
    message queuing to prevent data loss during disconnections with dedicated queues for collectible item inventory updates.

3. The method of claim 1, wherein the collectible items comprise trading cards, further comprising:
    receiving authentication data for physical trading cards including certification numbers and surface characteristics;
    linking each physical trading card to a corresponding NFT by its certification number;
    generating unique digital identifiers by cryptographically hashing the authentication data comprising a certification number and surface characteristics;
    minting non-fungible tokens (NFTs) on a blockchain using the unique digital identifiers that comprise physical card authentication data;
    validating ownership transfers by verifying both physical card certification and NFT token data.

4. The method of claim 1, wherein dynamically updating the digital interface comprises:
    decrementing available inventory counts in response to card collectible item acquisitions;
    recalculating odds for all remaining collectible items based on updated inventory levels;
    pushing updated odds data to all connected client interfaces through the communication channels;
    refreshing interface displays to show current odds and availability.

5. The method of claim 1, further comprising:
    maintaining a distributed database architecture comprising:
    a card collectible item inventory database tracking current quantities and status;
    a transaction history database recording acquisitions and transfers;
    a market metrics database storing pricing and demand data;
    implementing horizontal database sharding based on card series to optimize query performance.

6. A system for managing digital trading card collectible item distribution, comprising:
    a primary database cluster maintaining card collectible item inventory and transaction data;
    a connection manager enabling real-time bidirectional communication,
        wherein the communication comprises messages selected from the group consisting of indications that a collectible item has been sold, a new collectible item has been added to the queue and that the odds pertaining to a collectible item have changed;
    processing nodes executing odds calculations and inventory updates triggered by collectible item acquisitions;
    a blockchain integration layer managing NFT tokens and smart contracts for collectible item authentication;
    wherein the system improves the technological field of digital trading cards collectible items by:
        enabling real-time synchronization of inventory and odds data across distributed interfaces for transparent display of collectible item acquisition odds;
        implementing automated replenishment while maintaining market integrity;

providing secure integration between physical cards collectible items and digital assets.

7. The system of claim 6, wherein the collectible items consist of physical trading cards, further comprising:
- a certification number reader capturing physical card data;
- a surface characteristic scanner analyzing physical attributes;
- a hash generator creating unique digital identifiers;
- an NFT minting engine generating blockchain tokens;
- a smart contract validator verifying ownership transfers.

8. The system of claim 6, wherein the processing nodes comprise:
- an odds calculation engine continuously monitoring inventory changes;
- an inventory manager coordinating database updates;
- local caches maintaining frequently accessed data.

9. The method of claim 1, wherein the continuous replenishment mechanism maintains a plurality of collectible items per series and immediately replaces each acquired collectible item with a fresh collectible item to maintain consistent inventory levels.

10. The method of claim 1, further comprising implementing a Fisher-Yates shuffle algorithm for random collectible item selection within each tier while maintaining transparent odds display for each individual collectible item.

11. The method of claim 1, wherein the distributed database architecture comprises:
- horizontal database sharding based on collectible item series with dedicated inventory, transaction history, and market metrics databases;
- processing nodes maintaining local caches with periodic synchronization for collectible item odds calculations.

* * * * *